United States Patent [19]

Esposito

[11] Patent Number: 5,896,260
[45] Date of Patent: Apr. 20, 1999

[54] ELECTRONIC SAFETY BREAK AND METHOD

[75] Inventor: Anthony G. Esposito, Havre de Grace, Md.

[73] Assignee: CSS Power, Inc., White Marsh, Md.

[21] Appl. No.: 08/596,997

[22] Filed: Feb. 5, 1996

[51] Int. Cl.[6] ................................................. H02H 3/18
[52] U.S. Cl. ....................................... 361/79; 361/187
[58] Field of Search ........................... 361/79, 187, 78, 361/100–102, 115, 170; 307/64, 85–86, 66, 87, 116, 125, 130–131, 132 E, 132 EA; 323/274–277

[56] References Cited

U.S. PATENT DOCUMENTS

| | | | |
|---|---|---|---|
| 4,181,842 | 1/1980 | Elias et al. | 307/66 |
| 4,367,423 | 1/1983 | Horung | 307/597 |
| 4,394,703 | 7/1983 | Butcher | 361/101 |
| 4,466,042 | 8/1984 | Zylstra et al. | 361/115 |
| 4,476,511 | 10/1984 | Saletta et al. | 361/96 |
| 4,558,310 | 12/1985 | McAllise | 340/661 |
| 4,616,216 | 10/1986 | Meirow et al. | 340/644 |
| 4,617,473 | 10/1986 | Bingham | 307/66 |
| 4,628,303 | 12/1986 | Boyle | 340/661 |
| 4,714,916 | 12/1987 | Schweitzer, Jr. | 340/664 |
| 4,794,332 | 12/1988 | Schweitzer, Jr. | 324/133 |
| 4,831,483 | 5/1989 | Matsumura et al. | 361/98 |
| 4,835,649 | 5/1989 | Salerno | 361/18 |
| 4,845,476 | 7/1989 | Rangeard et al. | 340/660 |
| 4,853,820 | 8/1989 | Ham, Jr. et al. | 361/59 |
| 4,905,145 | 2/1990 | Whidden et al. | 361/92 |
| 4,951,171 | 8/1990 | Tran et al. | 361/90 |
| 4,952,864 | 8/1990 | Pless et al. | 323/299 |
| 4,979,066 | 12/1990 | Kawata et al. | 361/79 |
| 5,010,293 | 4/1991 | Ellersick | 323/278 |
| 5,034,728 | 7/1991 | Taylor | 340/663 |
| 5,086,366 | 2/1992 | Ishii et al. | 361/94 |
| 5,442,515 | 8/1995 | Wallaert | 361/187 |

*Primary Examiner*—Jeffrey A. Gaffin
*Assistant Examiner*—Michael J. Sherry
*Attorney, Agent, or Firm*—Covington & Burling

[57] ABSTRACT

This invention provides an electronic safety break device and method for protecting an electrical circuit. In a preferred embodiment, the electronic safety break device of this invention includes switching means for making and breaking an electrical connection, current measuring means for measuring the magnitude and direction of the current flowing through the connection, voltage measuring means for measuring voltage on each side of the electrical connection, and means responsive to the current and voltage measuring means for controlling the switching means. The electronic safety break device and method of the present invention thus provide for a bidirectional safety break for an electrical connection between a rechargeable battery and a load and other external circuitry, protecting the battery from excessive charge and discharge currents and from undervoltage and overvoltage conditions, or any combination of these conditions.

2 Claims, 9 Drawing Sheets

ELECTRONIC SAFETY BREAK AND METHOD

BACKGROUND OF THE INVENTION

This invention relates to circuit breakers, and more particularly to overcurrent and undervoltage circuit protection.

DESCRIPTION OF THE RELEVANT ART

Circuit breakers are used to protect electrical circuits by interrupting electrical current to a load when an overcurrent condition or other fault occurs in the circuit. A circuit breaker may be a simple fuse, an electromechanical device, or an entirely electronic device.

Typically, circuit breakers are designed and constructed to interrupt a circuit, or "trip," in the event that a particular predetermined parameter of the circuit, such as the current to the load, reaches a predetermined value. Accordingly, changing the parameter or value of the parameter at which a circuit breaker will trip usually requires replacing the entire circuit breaker.

Similarly, various means have been developed for resetting a circuit breaker in order to restore power to the load once the condition that prompted the breaker to trip has been remedied. Resetting a fuse requires replacing the fuse, and resetting an electromechanical breaker such a switch typically requires manual or electromechanical manipulation of the switching mechanism. While electronic circuit breakers have been developed to overcome these problems with mechanical and electromechanical devices, electronic circuit breakers typically only operate to reset the breaker upon the occurrence of conditions that are permanently built into the design of the circuit breaker and are therefore difficult to modify.

SUMMARY OF THE INVENTION

An object of the invention is to provide an electronic safety break with a high degree of flexibility and increased functionalities over conventional circuit breakers.

Another object of the invention is to provide a controlled switch, wherein the controlling means for the switch is responsive to either or both current and voltage measurements, such that the switch can be made to open or close based on a variety of conditions, including conditions defined by combinations of voltage and current levels.

A further object of the invention is to provide a controlled switch wherein the controlling means for the switch is responsive to measurements of both the magnitude and direction of current flowing through the switch, such that the switch can serve as a bidirectional circuit breaker with different interrupt or "trip" values for each direction of current flowing through the switch.

Another object of the invention is to provide a controlled switch, wherein the controlling means for the switch is responsive to measurements of voltage and current magnitude and direction.

A further object of the invention is to provide a controlled switch, wherein the controlling means for the switch is responsive to measurements of current magnitude and direction and to measurements of voltage on each side of the switch.

Another object of the invention is to provide a switch for connecting a backup power source to an external circuit, where the switch serves to prevent the backup power supply from excessive discharge and also serves as a bidirectional circuit breaker protecting the backup power supply from excessive discharge and charge currents.

A further object of the invention is to provide a controlled switch and a means for inputting and outputting parameters, wherein the controlling means for the switch is responsive to voltage and current measurements and to the inputting and outputting means, such that the switch can be made to open or close based on a variety of conditions, including conditions defined by combinations voltage conditions, current conditions and other conditions input into the invention.

Another object of the present invention is to provide a method for monitoring current through and voltage across an electrical connection and controlling a switch for making and breaking that connection responsive to those measurements.

The present invention, as broadly described herein, provides an electronic safety break including a switching means for making and breaking an electrical connection, a current measuring means for measuring current flowing through the electrical connection, a voltage measuring means for measuring voltage at the electrical connection, and a means for controlling the switching means. The controlling means in the invention is responsive to the current and voltage measuring means.

The present invention, as broadly described herein, also provides an electronic safety break including a switching means for making and breaking an electrical connection, a current measuring means for measuring both the magnitude and the direction of current flowing through the electrical connection, and a means for controlling the switching means that is responsive to both the current magnitude and direction measurements made by the current measuring means. This aspect of the invention allows, for example, the invention to serve as bidirectional safety break for the connection between a rechargeable battery and external circuitry. Because the invention thus distinguishes between different current levels in different directions, it can protect a battery both from excessive discharge currents, which might be caused by a short in the external circuit, and from excessive charge currents, which could also damage the battery.

The present invention, as broadly described herein, may also provide an electronic safety break including switching means for making and breaking an electrical connection, a first voltage measuring means for measuring voltage on one side of the connection, and a second voltage measuring means for measuring voltage on another side of the electrical connection. The invention may thus protect a rechargeable battery from both undervoltage and overvoltage conditions.

Another embodiment of the electronic safety break invention includes a switching means for making and breaking an electrical connection, a current measuring means for measuring the magnitude and direction of current, a voltage measuring means and a means for controlling the switching means. The embodiment may include a second voltage measuring means and a means for inputting and outputting parameters. The controlling means may also be fully electronic and may contain latching logic. The means for controlling the switch is responsive to measurements of current and voltage and to input parameters entered through the inputting and outputting means. Thus, the operations of the switch can be functions of combinations of current and voltage measurements and of any input parameters from external sources.

The present invention, as broadly described, also includes a method for controlling a switch for making and breaking an electrical connection, including the steps of measuring current through the electrical connection, monitoring voltage across the connection and controlling the switch in response to those measurements. The current measuring step may include measuring both the direction and magnitude of the current through the electrical connection. The voltage measuring step may include measuring the voltage on each side of the electrical connection.

Additional objects and advantages of the invention are set forth in part in the description which follows, and in part are obvious from the description, or may be learned by practice of the invention. The objects and advantages of the invention may also be realized and attained by means of the instrumentalities and combinations particularly set out in the appended claims.

BRIEF DESCRIPTION OF THE DRAWINGS

The accompanying drawings, which are incorporated in and constitute part of the specification, illustrate preferred embodiments of the invention, and together with the description, serve to explain the principles of the invention.

DETAILED DESCRIPTION OF THE PREFERRED EMBODIMENTS

Reference will now be made in detail to the present preferred embodiment of the invention, examples of which are illustrated in the accompanying drawings, wherein like reference numerals indicate like elements throughout the several views.

Figure 1:
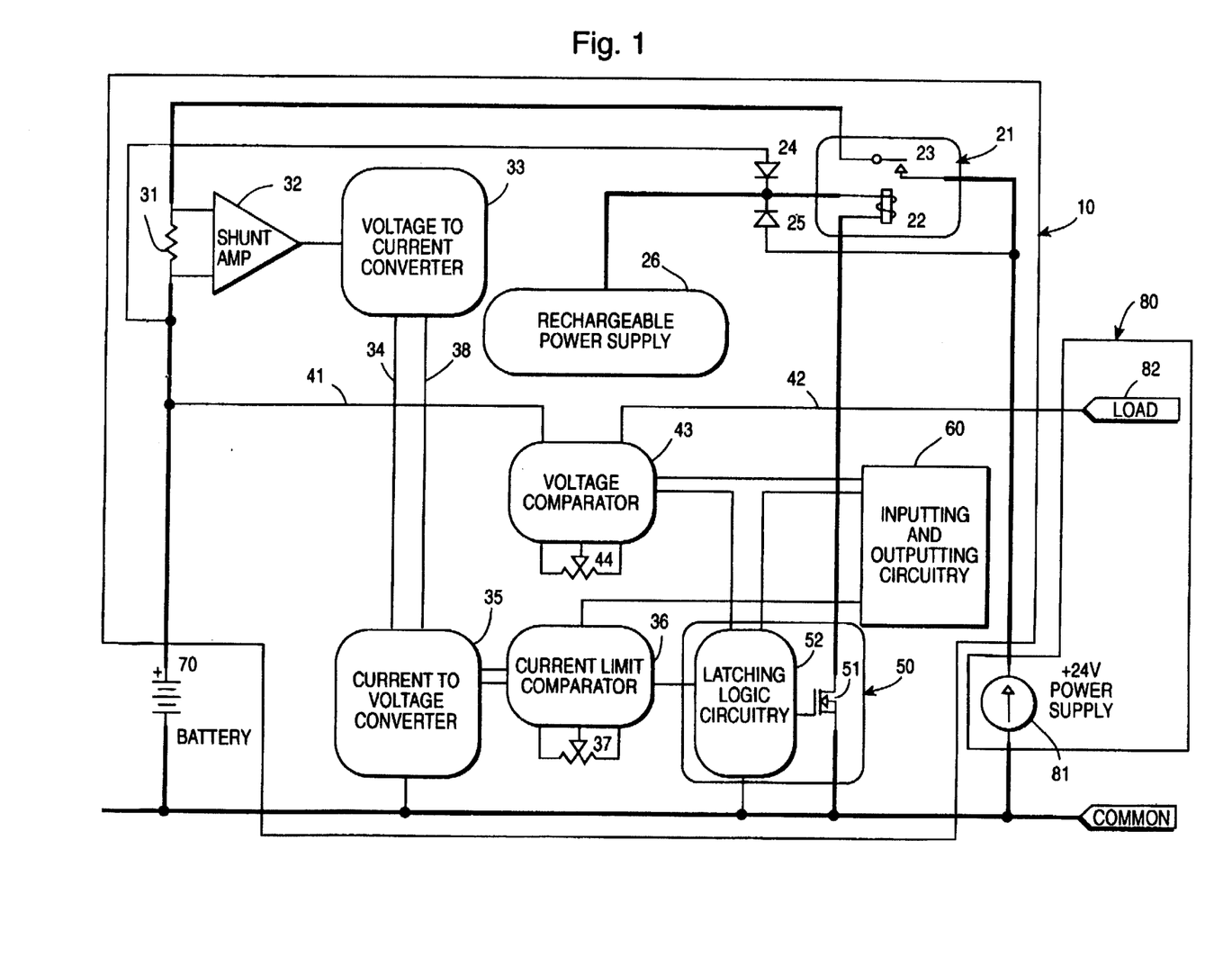
FIG. 1 is a block diagram depicting an electronic safety break device.

FIG. 1 depicts a preferred embodiment of an electronic safety break device 10, including switching means, current measuring means, voltage measuring means, inputting and outputting means and controlling means. The electronic safety break 10 is connected to external circuity, usually including power supply means and loads, as well a auxiliary power means for use when the power supply means is not functioning properly.

In the electronic safety break 10 depicted in FIG. 1, the switching means is connected to the controlling means. The current measuring means and the voltage measuring means are each connected to the inputting and outputting means and to the controlling means. The controlling means and the inputting and outputting means are also connected to each other.

The switching means of the electronic safety break 10 functions to make and break an electrical connection, and may employ a solenoid-controlled switch, a bipolar junction transistor, a field effect transistor device or other switching device known in the art.

The current measuring means measures the current flowing through the electrical connection. In a preferred embodiment, the current measuring means measures both the magnitude and direction of the current flowing through the electrical connection. The current measuring means may include a precision low-resistance value resistor, associated amplifiers, level translation circuitry and precision voltage comparators; may rely on Hall effect measurements; or may utilize other current-measuring techniques known in the art.

The voltage measuring means measures voltage at the electrical connection. In a preferred embodiment, the voltage measuring means includes means for measuring voltage on either side of the electrical connection. The voltage measuring means may be a comparator to a reference voltage level or other device or circuitry known in the art for measuring voltage.

The inputting and outputting means allows a user to input parameters, data and/or programs into electronic safety break 10 and displays output parameters to the user. The inputting and outputting means could be a simple array of switches and LED lights, a standard interface for a computer system, or other devices and circuitry known in the art for inputting and outputting information. The inputting and outputting means communicates with the current measuring means, the voltage measuring means and the controlling means.

The controlling means is responsive to the current measuring means, the voltage measuring means and the inputting and outputting means. In a preferred embodiment, the controlling means can control the switch means based on a variety of conditions, including conditions defined by combinations of voltage and current conditions at the electrical connection. The controlling means may comprise latching logic means controlling a MOSFET transistor or other circuitry known in the art that is capable of generating a signal to which the switching means will be responsive.

FIG. 1 depicts a preferred embodiment of an electronic safety break device 10. As depicted in FIG. 1, electronic safety break 10 is connected to external circuitry including +24 volt power supply 81 and load 82, as well as battery 70.

In the embodiment depicted in FIG. 1, the switching means of electronic safety break 10 comprises an electromechanical switch unit 21 and a rechargeable power supply 26. The current measuring means includes a precision resistor 31, a shunt amp 32 and associated circuitry. The voltage measuring means includes voltage sensing line 41, voltage sensing line 42, voltage comparator 43, and potentiometer 44. The inputting and outputting means includes inputting and outputting circuitry 60. The controlling means comprises MOSFET 51 and latching logic circuitry 52.

The electromechanical switch unit 21 depicted in FIG. 1 includes a solenoid 22 and an electromechanical switch mechanism 23. Rechargeable power supply 26 provides the necessary power for solenoid 22 to open and close the electromechanical switch mechanism 23. Power to recharge rechargeable power supply 26 is obtained through diode 24 and diode 25. The electromechanical switch unit 21 is controlled by MOSFET 51.

In another preferred embodiment, not depicted in FIG. 1, the switching means may comprise a power transistor to accomplish the functions of solenoid 22 and electromechanical switch mechanism 23. In such a preferred embodiment, the switching means could then be controlled by a signal that turns on and off the power transistor.

As depicted in FIG. 1, the current measuring means includes precision resistor 31, shunt amp 32, voltage-tocurrent converter 33, current line 34, current line 38, current-to-voltage converter 35, current limit comparator 36, and potentiometer 37. Current flowing across resistor 31 generates a voltage signal that is amplified by shunt amp 32. Voltage-to-current converter 33 converts the amplified voltage signal from shunt amp 32 into current. This current flows through current line 34 and current line 38 to current-to-voltage converter 35, which converts the current signal into a voltage signal that is ground referenced. The ground-referenced voltage signal is then compared in current limit comparator 36 to a first reference voltage selected through use of potentiometer 37. Current limit comparator 36 outputs information to both latching logic circuitry 52 and inputting and outputting circuitry 60. In an alternative embodiment not depicted in FIG. 1, the functions served by potentiometer 37 could also be accomplished through a variety of different circuitry, including circuitry that is addressable and programmable by a microprocessor.

In the preferred embodiment depicted in FIG. 1, the voltage measuring means includes voltage sensing line 41 and voltage sensing line 42, voltage comparator 43, and potentiometer 44. Voltage comparator 43 measures the voltage of battery 70 on voltage sensing line 41 and the voltage of power supply 81 on voltage sensing line 42 and compares those voltages to a second reference voltage selected through use of potentiometer 44. The voltage comparator 43 outputs information to both switch controller 50 and inputting and outputting circuitry 60. In an alternative embodiment not depicted in FIG. 1, the functions served by potentiometer 44 could also be accomplished through a variety of different circuitry, including circuitry that is addressable and programmable by a microprocessor.

Inputting and outputting circuitry 60 allows the inputting of parameters, information, or programs into electronic safety break 10, and provides output, which may include measurements of current and voltage, status of latching logic circuitry 52, and other data. Inputting and outputting circuitry 60 communicates with current limit comparator 36, voltage comparator 43, and latching logic circuitry 52.

In the preferred embodiment depicted in FIG. 1, the controlling means for the electromechanical switch unit 21 includes MOSFET 51 and latching logic circuitry 52. Latching logic circuitry 52 receives input signals from current limit comparator 36, voltage comparator 43, and inputting and outputting circuitry 60. Based on those input signals, latching logic 52 controls MOSFET 51. Where latching logic circuitry 52 turns on MOSFET 51, MOSFET 51 allows current to flow from power supply 26 through solenoid 22, thereby opening electromechanical switch mechanism 23. Where latching logic circuitry 52 turns off MOSPET 51, MOSFET 51 stops current flow from power supply 26 through solenoid 22, thereby closing electromechanical switch mechanism 23.

In the embodiment depicted in FIG. 1, the electronic safety break 10 is used in conjunction with a rechargeable battery 70 and external circuitry 80, which includes both a +24 volt power supply 81 and a load 82. In this embodiment, the electronic safety break 10 can be used to connect the rechargeable battery 70 to the external circuitry 80 and thereby to ensure backup power to load 82 in the event that power supply 81 fails. In such circumstances, the rechargeable battery 70 would serve as a backup power supply to drive load 82. Electronic safety break 10 may also monitor current conditions and may disconnect rechargeable battery 70 where external circuitry 80 draws an excessive discharge current from rechargeable battery 70. Electronic safety break 10 may also monitor current and voltage conditions and disconnect rechargeable battery 70 from external circuitry 80 to prevent rechargeable battery 70 from excessive discharge.

The embodiment of an electronic safety break 10 depicted in FIG. 1 may also be used to connect the rechargeable battery 70 to the external circuitry 80 so that rechargeable battery 70 can be recharged. In such circumstances, power supply 81 would provide current to recharge rechargeable battery 70. Electronic safety break 10 may also monitor current conditions and disconnect rechargeable battery 70 from the external circuitry 80 when an excessive charge current is being provided to rechargeable battery 70.

Figure 2:
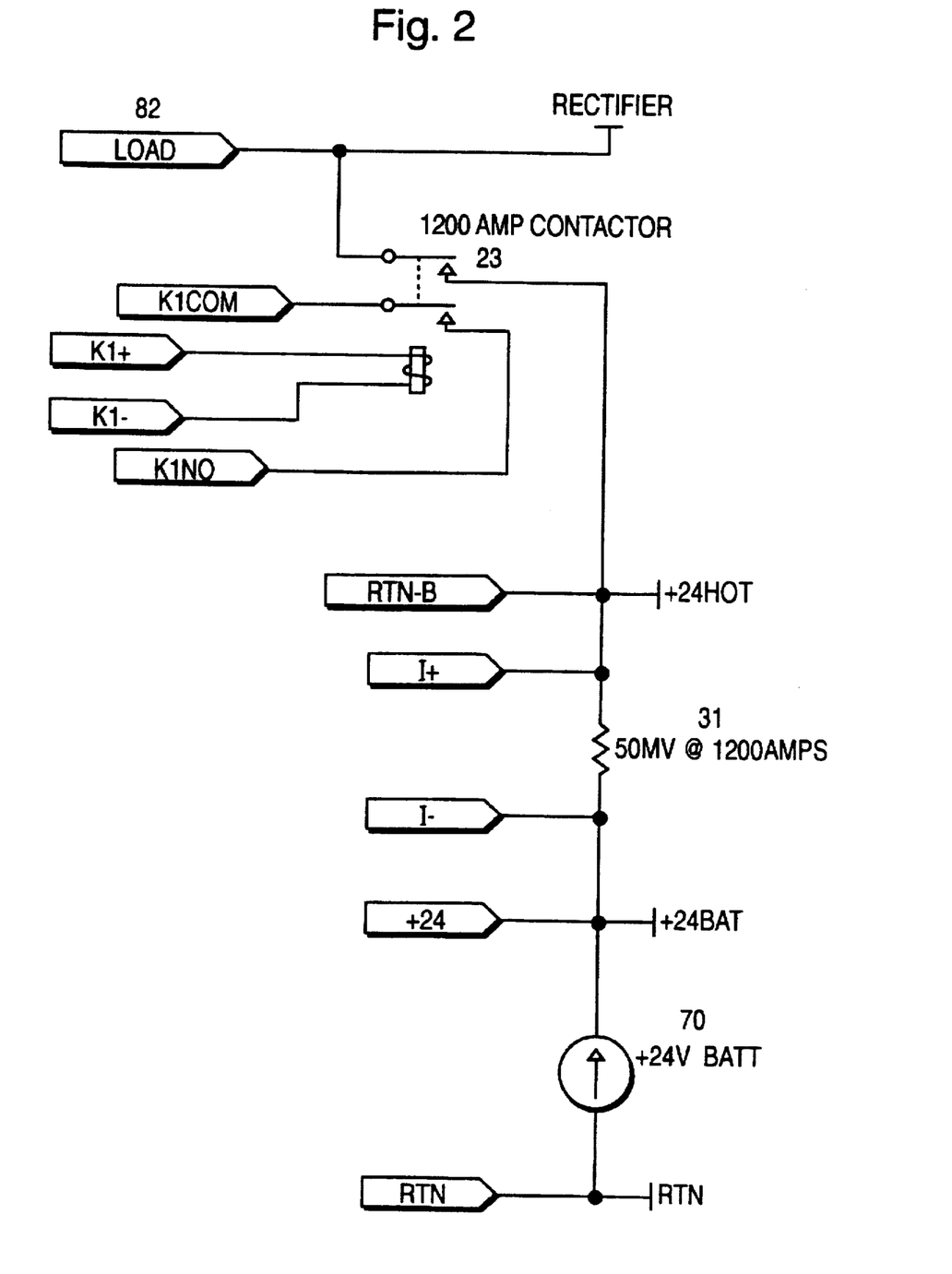
FIG. 2 is a schematic diagram showing a preferred embodiment of the power control relay and shunt resistor portion of an electronic safety break according to the present invention.

FIGS. 2 through 5, taken together, depict the circuit diagram for a preferred embodiment of an electronic safety break. The circuit diagram is similar to the more general depiction of FIG. 1. In FIG. 2, battery 70 is connected to an external load and other circuitry at load 82 through current shunt resistor 31 and switch mechanism 23. The voltage developed across shunt resistor 31 due to current flowing between battery 70 and load 82 is measured and amplified by shunt amp 32, depicted in FIG. 4, and associated circuitry. The output of shunt amp 32 will be a positive signal when the battery 70 is being discharged. The output of shunt amp 32 will be a negative signal when battery 70 is being charged.

Figure 4A:
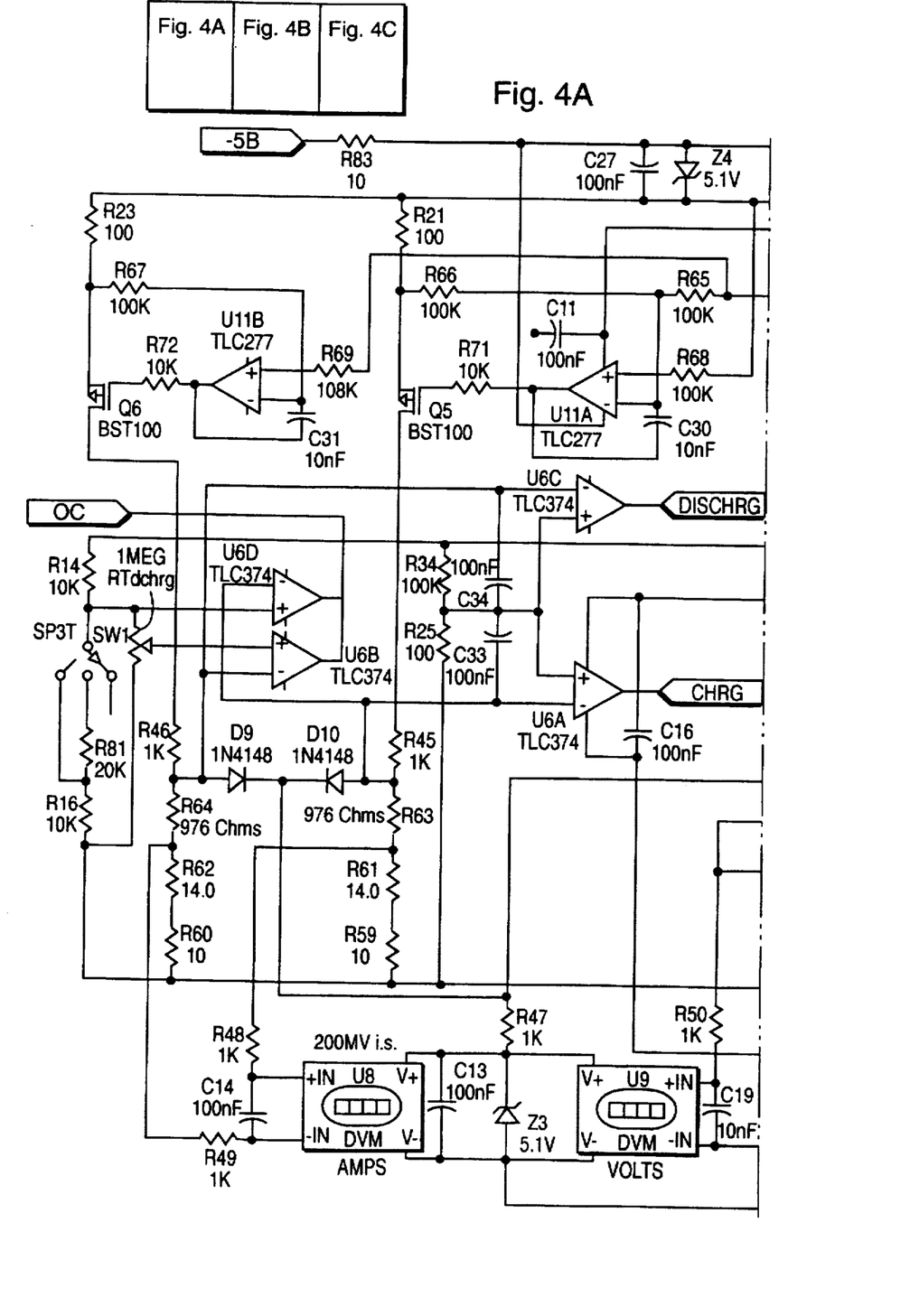
FIG. 4 is a schematic diagram showing a preferred embodiment of the current and voltage measuring conversion and comparing portions of an electronic safety break according to the present invention.
Figure 4B:
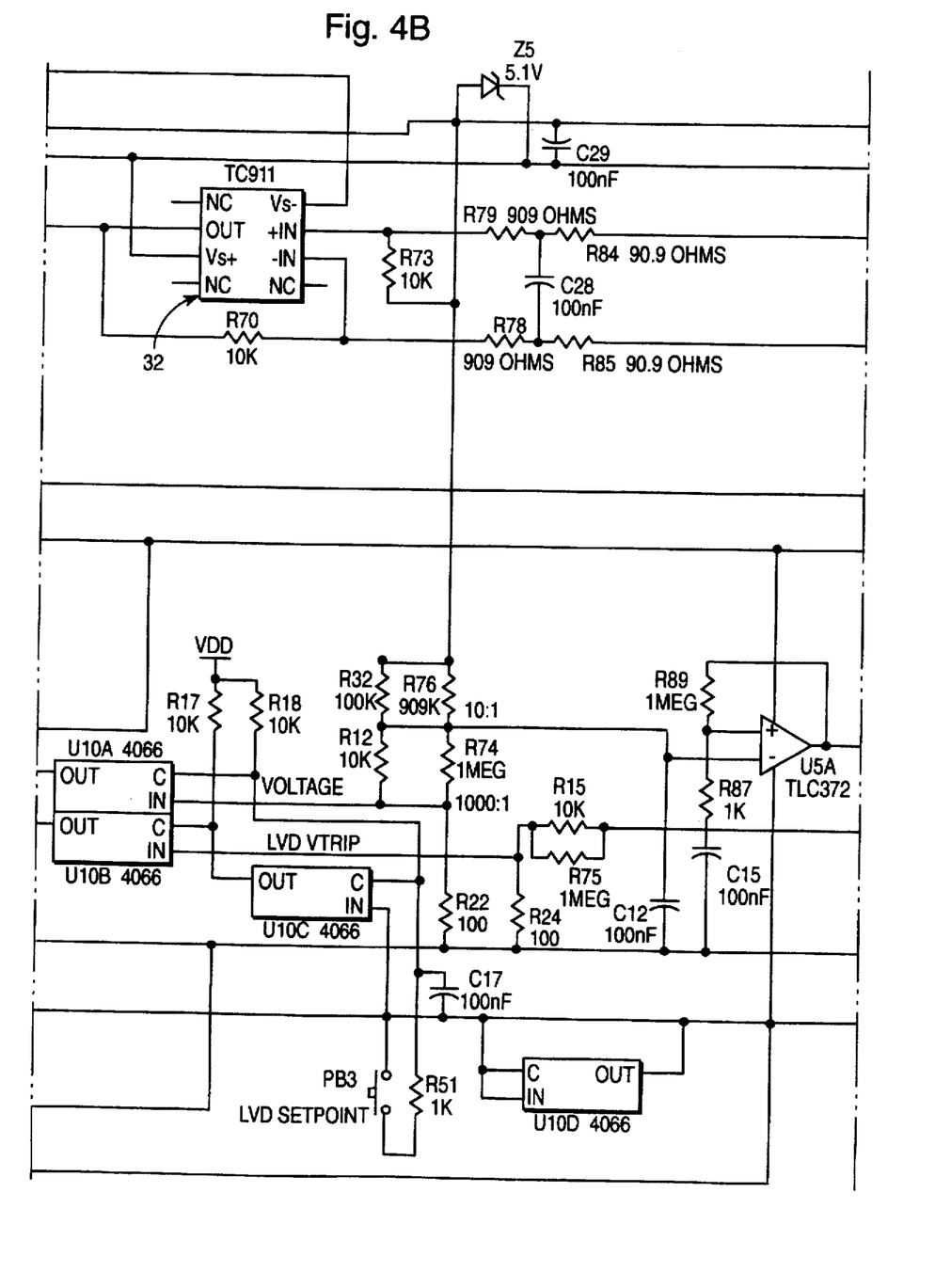
Figure 4C:
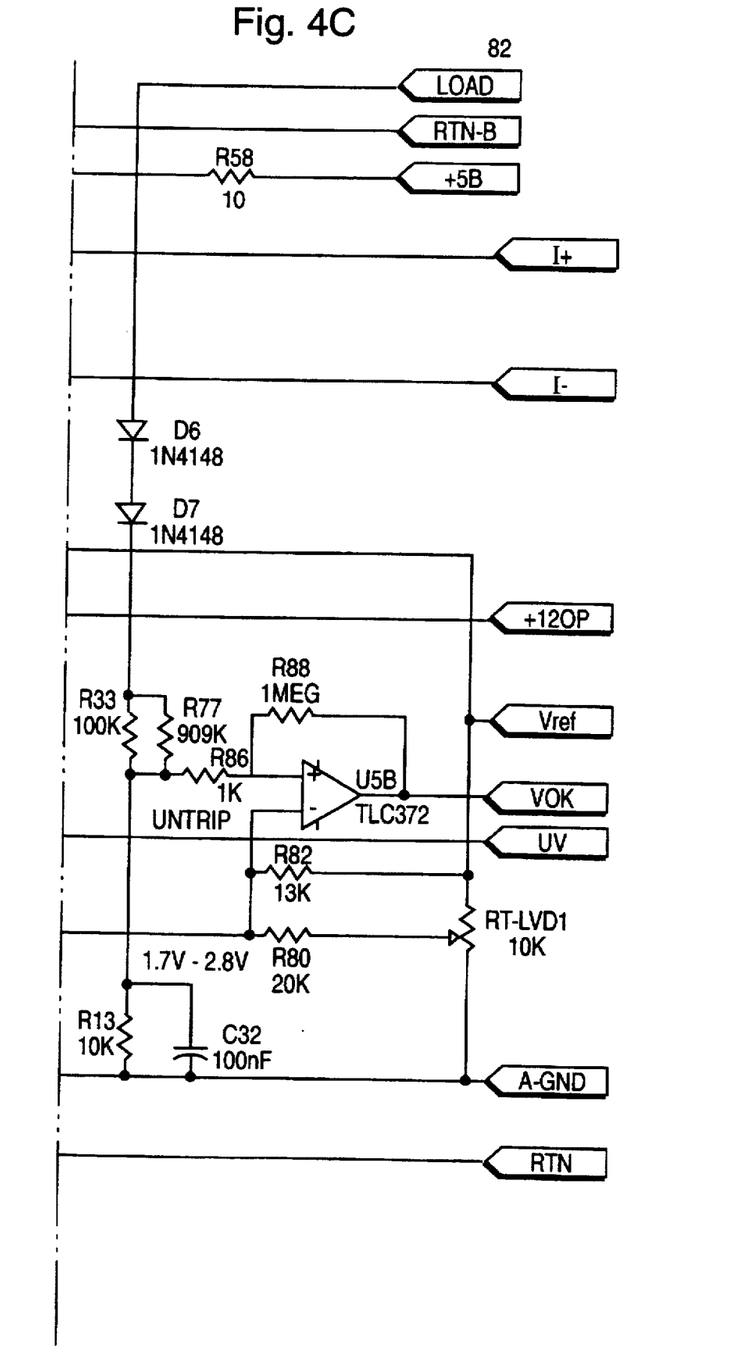
Figure 5A:
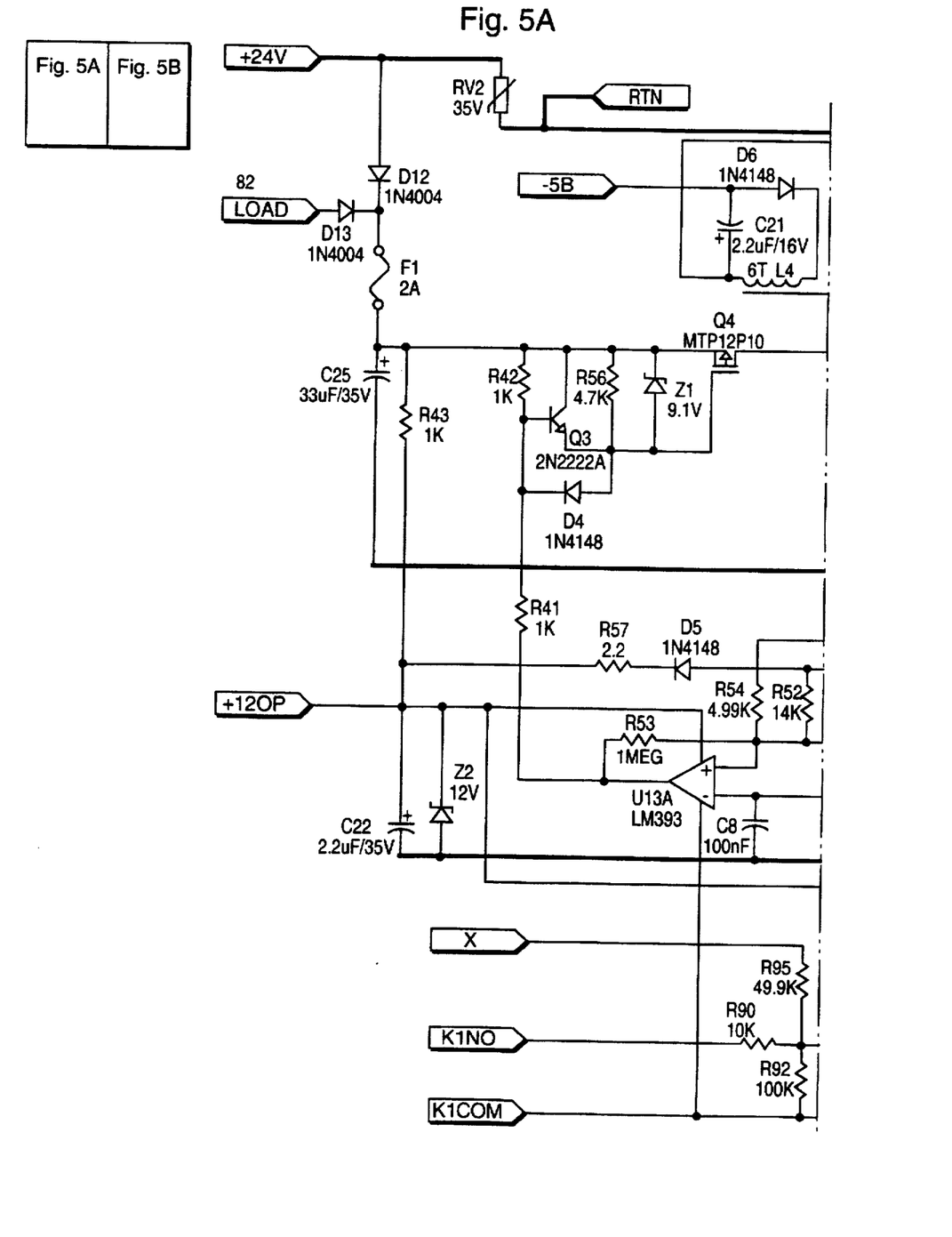
FIG. 5 is a schematic diagram showing a preferred embodiment of additional support circuitry for an electronic safety break according to the present invention.
Figure 5B:
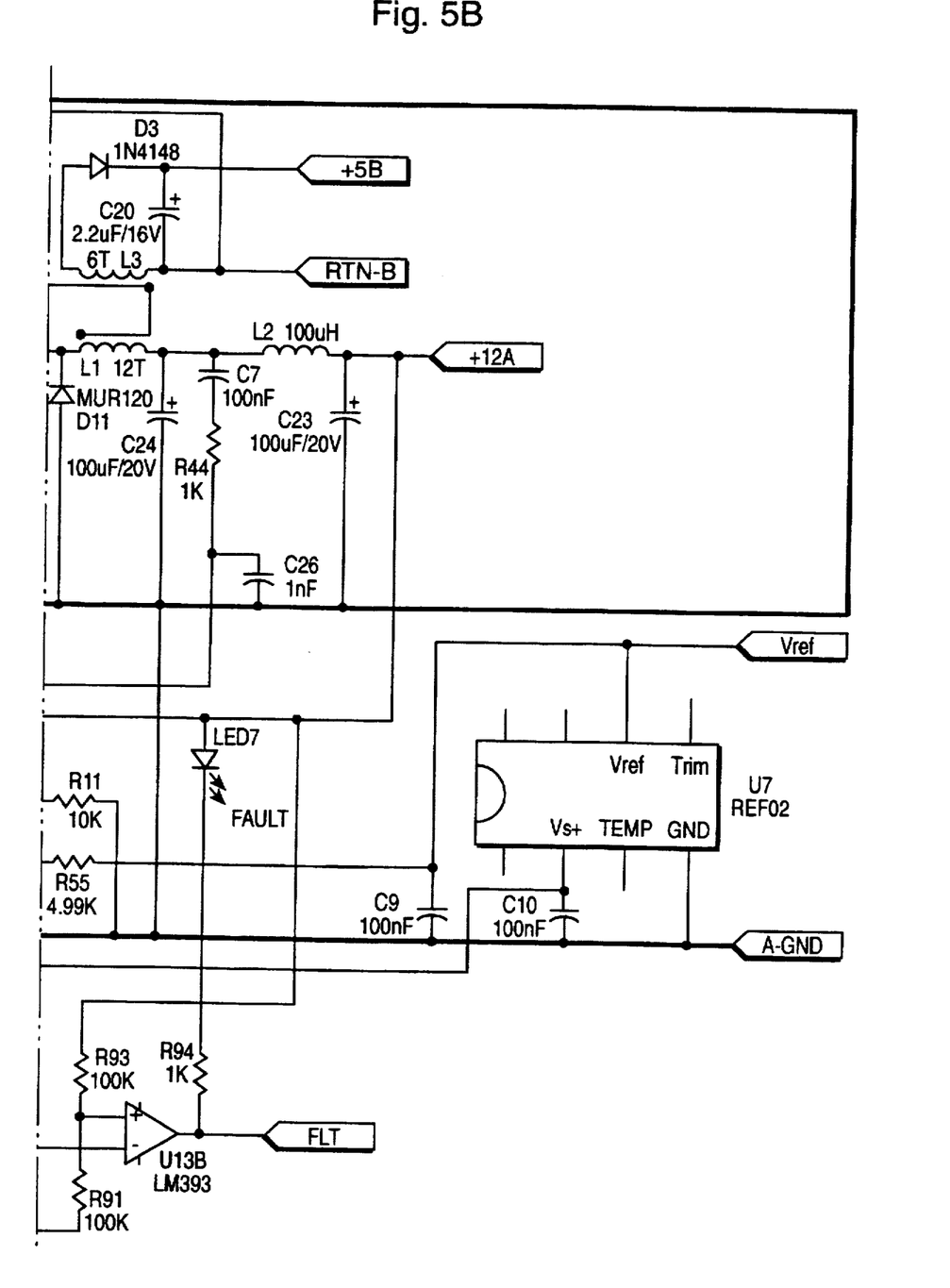

FIG. 4 depicts a preferred embodiment of the current measuring means shown more generally in FIG. 1. Negative outputs of shunt amp 32 are converted to source current signals by operational amplifier U11B, MOSFET Q6, and associated circuitry. Positive outputs of shunt amp 32 are converted to source current signals by operational amplifier U11A, MOSFET Q5, and associated circuitry. Operational amplifiers U11A and U11B, MOSFETS Q5 and Q6 and associated circuitry, shown in FIG. 4, depict a preferred embodiment of voltage-to-current converter 33 shown more generally in FIG. 1.

Returning to FIG. 4, current signals from MOSFET Q6, corresponding to battery 70 discharging, are converted to voltage signals at ground reference level by resistors R64, R62, and R60. Current signals from MOSFET Q5, corresponding to battery 70 charging, are converted to voltage signals at ground reference level by resistors R63, R61, and R59. These sets of resistors and associated circuitry, shown in FIG. 4, depict a preferred embodiment of current-to-voltage converter 35 shown more generally in FIG. 1.

Returning to FIG. 4, the voltage signal produced by resistors R64, R62, and R60 is compared to a percentage of threshold voltage, set by switch SW1 and potentiometer RTdcharg, in comparator U6B. The voltage signal produced by resistors R64, R62, and R60 also produce a discharge indication from comparator UGC when battery 70 is discharging. The voltage signal produced by resistors R63, R61, and R59 is compared to a threshold voltage, set by switch SW1, in comparator U6D. The voltage signal produced by resistors R63, R61, and R60 also results in a charge indication from comparator U6A when battery 70 is charging. The outputs of comparators U6B and U6D are connected together to provide an overcurrent signal when the current level exceeds the thresholds selected by switch SW1 and potentiometer RTdcharg regardless of whether battery 70 is charging or discharging. Comparators U6B and U6D and associated circuitry, shown in FIG. 4, depict a preferred embodiment of current limit comparator 36 shown more generally in FIG. 1.

Figure 3A:
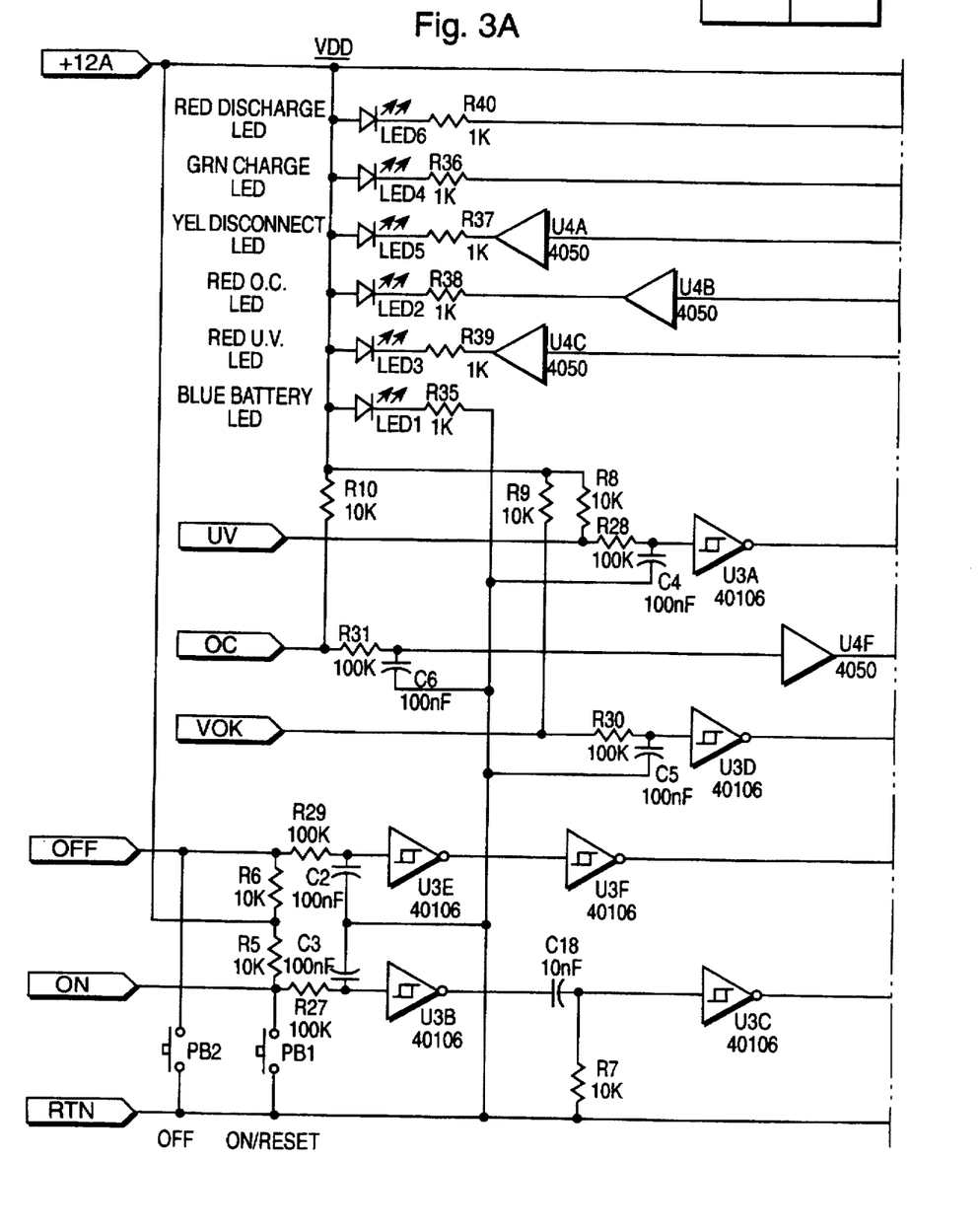
FIG. 3 is a schematic diagram showing a preferred embodiment of latching logic and inputting and outputting portions of an electronic safety break according to the present invention.
Figure 3B:
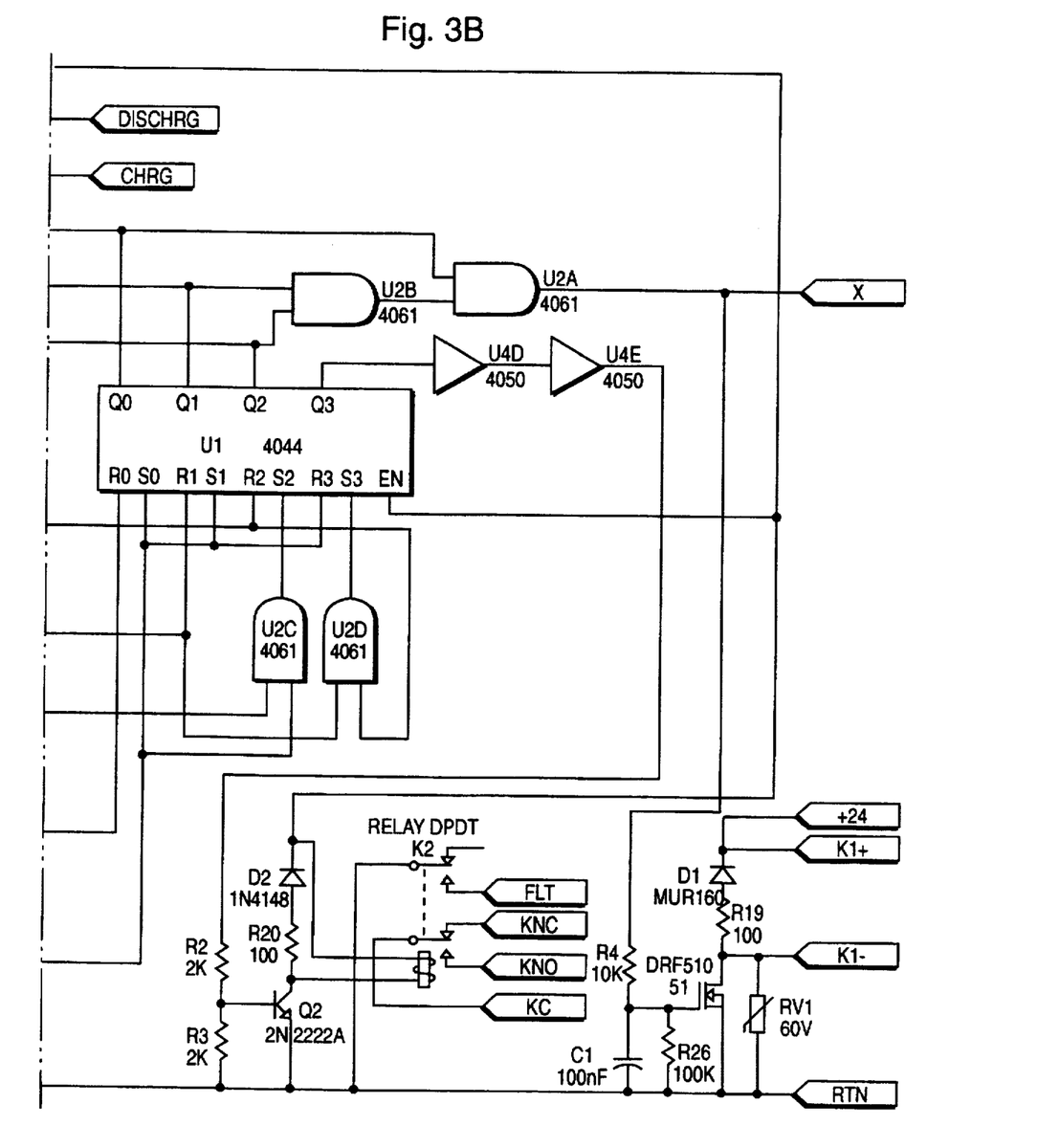

When an overcurrent condition exists, the overcurrent signal produced by comparators U6B and U6D shown in FIG. 4 causes output Q1 of latch U1, depicted in FIG. 3, to deactivate. The deactivation of output Q1 of latch U1, conditioned by AND gates U2B and U2A, causes MOSFET 51 to deactivate relay 21 (depicted on FIG. 2), thereby disconnecting battery 70 from load 82. Latch U1, MOSFET 51, and associated circuitry, shown in FIG. 3, depict a preferred embodiment of latching logic circuitry 52 and MOSFET 51 shown more generally in FIG. 1. An overcurrent signal also causes output Q3 of latch U1 to activate, which energizes alarm relay K2 through MOSFET Q2 and amplifiers U4E and U4D. MOSFET Q2, alarm relay K2 and associated circuitry, shown in FIG. 3, depict a preferred embodiment of inputting and outputting circuitry 60 shown more generally in FIG. 1.

FIG. 4 also depicts a preferred embodiment of circuitry to detect over- and under-voltage conditions. The battery 70 voltage is compared to a voltage set by potentiometer RT-LVD1 in comparator U5A. Potentiometer RT-LVD1 can be adjusted to cause comparator U5A to drive the signal UV high when the battery 70 voltage falls below a desired level. Similarly, when the voltage at load 82 is approximately one to two volts above the programmed threshold set by potentiometer RT-LVD1, comparator U5B drives the signal VOK high, thereby detecting that the undervoltage condition at load 82 has been removed. Potentiometer RT-LVD1, and comparators U5A and U5B and associated circuitry, shown in FIG. 4, depict a preferred embodiment of the voltage measuring means shown more generally in FIG. 1.

Returning to FIG. 3, the UV and VOK signals, as with the overcurrent signal described, affect the operation of latch U1. When UV is high, output Q2 of latch U1 deactivates MOSFET 51 through AND gates U2A and U2B. The deactivation of MOSFET 51 deactivates switch mechanism 23 (depicted on FIG. 2) thereby disconnecting battery 70 from load 82. Also, a UV high signal causes output Q3 of latch U1 to activate, which energizes alarm relay K2 through MOSFET Q2 and amplifiers U4D and U4E. When VOK is high, output Q2 of latch U1 deactivates MOSFET 51 through AND gates U2A and U2B. Again, the deactivation of MOSFET 51 deactivates switch mechanism 23 (depicted on FIG. 2) thereby disconnecting battery 70 from load 82. When both UV and VOK are low, output Q2 of latch U1 causes MOSFET 51 to activate switch mechanism 23 (depicted on FIG. 2) thereby connecting battery 70 to load 82.

FIG. 3 also depicts a preferred embodiment of inputting and outputting circuitry 60 shown more generally in FIG. 1. As shown in FIG. 3, pressing pushbutton PB1 or a low ON signal will operate on latch U1 and (1) cause MOSFET 51 to activate switch mechanism 23 (depicted on FIG. 2), thereby connecting battery 70 to load 82; (2) cause MOSFET Q2 to disable alarm relay K2, provided that UV and VOK are low, and there is not an overcurrent condition; (3) reset fault displays LED2 and LED5. Pressing PB2 or a low OFF will operate on latch U1 and cause MOSFET 51 to deactivate switch mechanism 23 (depicted on FIG. 2), thereby disconnecting battery 70 from load 82.

Additional circuitry depicted on FIGS. 2 through 5 accommodates power supply requirements for a preferred embodiment of electronic safety break 10 in a manner apparent to one of skill in the art and depicts a preferred embodiment of a portion of inputting and outputting circuitry 60 shown more generally in FIG. 1.

The present invention, as broadly described, also includes a method for controlling a switch for making and breaking an electrical connection, including the steps of measuring current through the electrical connection, monitoring voltage across the connection and controlling the switch in response to those measurements. The current measuring step may include measuring both the direction and magnitude of the current through the electrical connection. The voltage measuring step may include measuring the voltage on each side of the electrical connection.

It will be apparent to those skilled in the art that various modifications can be made to this invention of an electronic safety break device and method without departing from the scope or spirit of the invention. It is also intended that the present invention cover modifications and variations of the electronic safety break device and method with the scope of the appended claims and their equivalents.

I claim:

1. An electronic safety break device comprising:
   switching means for making and breaking an electrical connection;
   current measuring means for measuring both the magnitude and the direction of current flowing through the electrical connection;
   first voltage measuring means for measuring voltage on a first side of the electrical connection;
   second voltage measuring means for measuring voltage on a second side of the electrical connection;
   means for controlling said switching means, wherein said controlling means is responsive to said first voltage measuring means, said second voltage measuring means, and said current measuring means; and
   said current measuring means comprises
      means for generating a first voltage signal proportional to the magnitude of positive current flowing through the electrical connection;
      means for selecting a first reference voltage;
      means for comparing the first reference voltage to the first voltage signal generated by said current measuring means;
      means for generating a second voltage signal proportional to the magnitude of negative current flowing through the electrical connection;
      means for selecting a second reference voltage; and
      means for comparing the second reference voltage to the second voltage signal generated by said current measuring means.

2. An electronic safety break device as claimed in claim 1, wherein:
   said first voltage measuring means comprises means for selecting a reference voltage and means for comparing the reference voltage to the voltage measured by said first voltage measuring means; and
   said second voltage measuring means comprises means for selecting a reference voltage and means for comparing the reference voltage to the voltage measured by said second voltage measuring means.

* * * * *